United States Patent
Hümer et al.

(10) Patent No.: US 9,680,353 B2
(45) Date of Patent: Jun. 13, 2017

(54) ELECTRIC MACHINE AND METHOD FOR COOLING AN ELECTRIC MACHINE

(71) Applicant: SIEMENS AKTIENGESELLSCHAFT, München (DE)

(72) Inventors: Thomas Hümer, Nürnberg (DE); Ekkehard Ressel, Heilsbronn (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 235 days.

(21) Appl. No.: 14/436,792

(22) PCT Filed: Oct. 9, 2013

(86) PCT No.: PCT/EP2013/071029
§ 371 (c)(1),
(2) Date: Apr. 17, 2015

(87) PCT Pub. No.: WO2014/060255
PCT Pub. Date: Apr. 24, 2014

(65) Prior Publication Data
US 2015/0280520 A1    Oct. 1, 2015

(30) Foreign Application Priority Data
Oct. 19, 2012    (DE) .................. 10 2012 219 122

(51) Int. Cl.
*H02K 9/00*    (2006.01)
*H02K 9/06*    (2006.01)
(Continued)

(52) U.S. Cl.
CPC .................. *H02K 9/06* (2013.01); *H02K 5/24* (2013.01); *H02K 9/18* (2013.01)

(58) Field of Classification Search
CPC .. H02K 9/06; H02K 9/18; H02K 5/24; H02K 5/20; H02K 9/12
(Continued)

(56) References Cited

U.S. PATENT DOCUMENTS 2,697,179 A * 12/1954 Wendel .................... H02K 9/06
310/62
3,610,975 A * 10/1971 Onjanow ................. H02K 9/18
310/57
(Continued)

FOREIGN PATENT DOCUMENTS

DE    8130486 U1    3/1982
DE    10247310 A1    4/2004
(Continued)

*Primary Examiner* — Thanh Lam
(74) *Attorney, Agent, or Firm* — Henry M. Feiereisen LLC

(57) ABSTRACT

An electric machine includes an inner fan in an inner cooling circuit and an outer fan for producing an outer coolant flow that is separate from the inner cooling circuit. The inner and outer fans are connected to a common shaft of the electric machine and have opposite delivery directions along an axial direction of the electric machine. The outer fan is arranged in a fan housing which has an inlet opening for the inward flow of a coolant of the outer coolant flow, and includes an air directing device, which guides the coolant in a line section which extends in the radial direction of the electric machine from the inlet opening towards the outer fan.

5 Claims, 4 Drawing Sheets

(51) Int. Cl.
*H02K 9/18* (2006.01)
*H02K 5/24* (2006.01)

(58) Field of Classification Search
USPC .......................................... 310/52–59, 62–63
See application file for complete search history.

(56) References Cited

U.S. PATENT DOCUMENTS

| | | | | |
|---|---|---|---|---|
| 3,749,953 | A * | 7/1973 | Baumann | H02K 9/06 310/62 |
| 4,742,257 | A * | 5/1988 | Carpenter | H02K 9/14 310/57 |
| 6,700,235 | B1 * | 3/2004 | McAfee | H02K 9/06 310/52 |
| 7,777,374 | B2 | 8/2010 | Ressel | |
| 8,283,817 | B2 | 10/2012 | Weiss et al. | |
| D672,311 | S | 12/2012 | Labermeier et al. | |
| 8,405,261 | B2 | 3/2013 | Hümer et al. | |
| 8,614,528 | B2 | 12/2013 | Eichinger et al. | |
| 2004/0222711 | A1 * | 11/2004 | Klimt | H02K 9/18 310/59 |
| 2006/0204371 | A1 * | 9/2006 | Rexhauser | F04D 19/022 417/243 |
| 2006/0226717 | A1 * | 10/2006 | Nagayama | H02K 9/14 310/58 |
| 2008/0036314 | A1 * | 2/2008 | Kanei | H02K 9/08 310/59 |
| 2008/0106159 | A1 * | 5/2008 | Yoshida | H02K 11/33 310/50 |
| 2011/0006622 | A1 | 1/2011 | Weiss et al. | |
| 2011/0031831 | A1 | 2/2011 | Hümer et al. | |
| 2011/0127862 | A1 | 6/2011 | Eichinger et al. | |

FOREIGN PATENT DOCUMENTS

| | | |
|---|---|---|
| JP | S49116506 U | 10/1974 |
| JP | S58215955 A | 12/1983 |
| JP | S61149956 U | 9/1986 |
| JP | H07213018 A | 8/1995 |
| JP | H0823661 A | 1/1996 |

* cited by examiner

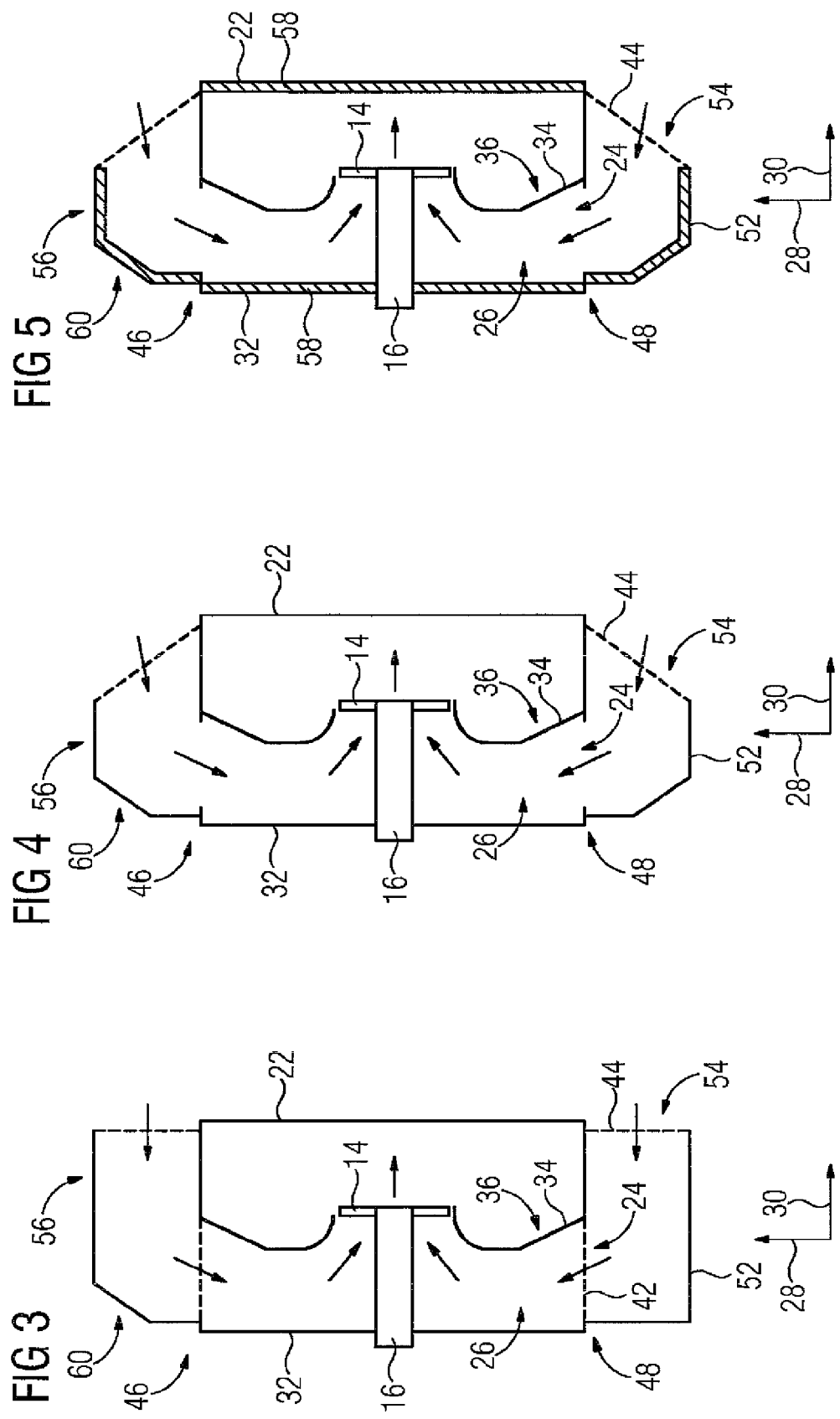

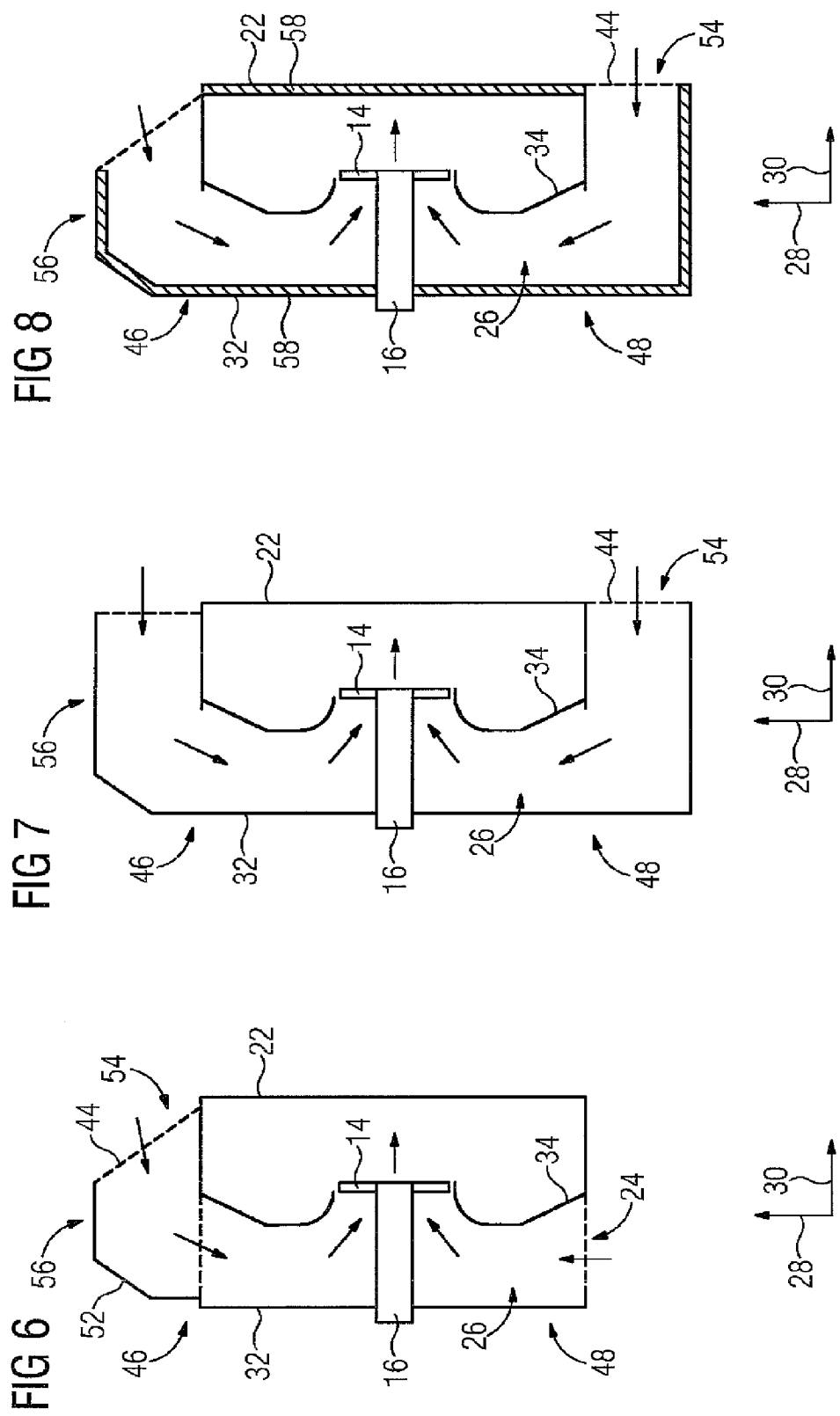

ELECTRIC MACHINE AND METHOD FOR COOLING AN ELECTRIC MACHINE

CROSS-REFERENCES TO RELATED APPLICATIONS

This application is the U.S. National Stage of International Application No. PCT/EP2013/071029, filed Oct. 9, 2013, which designated the United States and has been published as International Publication No. WO 2014/060255 and which claims the priority of German Patent Application, Serial No. 10 2012 219 122.4, filed Oct. 19, 2012, pursuant to 35 U.S.C. 119(a)-(d).

BACKGROUND OF THE INVENTION

The present invention relates to an electric machine. Beyond this the present invention relates to a method for cooling an electric machine.

To enable electrical machines to be cooled efficiently in operation, corresponding coolant circuits are provided. Electrical machines which are embodied for example in accordance with cooling type IC 611 have an inner coolant circuit with an inner fan and an outer coolant flow with an outer fan, which can be thermally coupled via a heat exchanger. With electrical machines having two fans which are connected to the shaft of the electrical machine, these fans create an axial force on the rotor as a whole. This force, which is created by the fans in the axial direction of the electrical machine, occurs in particular with rapidly rotating electrical machines. The axial force is additionally increased if, instead of two radial fans, one radial fan and one axial fan are used for example. If the magnetic resetting force which is created by the stator or the laminated core of the electrical machine is smaller than the axial force exerted by the fans, the entire rotor moves away from its geometrical center. With electrical machines which have a fixed bearing, the rotor moves by the play in the fixed bearing until it stops and then imposes an additional axial force on the fixed bearing. This problem also occurs with electrical machines which have a floating bearing for example.

To address the aforesaid problem, in no-load tests of such electrical machines, rotor holder facilities are used in order to hold the rotor in the geometrical center. A further option consists of imposing a high axial force on the fixed bearings in operation of the electrical machine. Furthermore it is known, with electrical machines which have two fans on a common shaft, to embody the fans so that their directions of conveyance are aligned in opposing directions. Thus for example a vertical electrical machine is known in which the outer fan is disposed rotated by comparison with the inner fan. This enables this electrical machine to be protected from rain or moisture since the coolant is sucked into the fan housing from below.

With such electrical machines the problem also exists of high levels of noise developing from the fans. In addition there is the danger that with the outer coolant flow the heated exhaust air will be sucked in again via the inlet opening of the fan housing of the outer fan.

SUMMARY OF THE INVENTION

The object of the present invention is therefore to provide an electrical machine which can be operated more efficiently and more flexibly.

According to one aspect of the present invention, the object is achieved by an electrical machine including an inner fan in an inner coolant circuit, an outer fan for creating an outer coolant flow which is separate from the inner coolant circuit, the inner fan and the outer fan being connected to a common shaft of the electrical machine and having opposing directions of conveyance along an axial direction of the electrical machine, and a fan housing which houses the outer fan and has an inlet opening for an inward flow of a coolant of the outer coolant flow, the fan housing having an air guidance device which guides the coolant in a line section extending in the radial direction of the electrical machine from the inlet opening to the outer fan.

According to another aspect of the present invention, the object is achieved by a method for cooling an electric machine wherein the electrical machine has an inner fan and an outer fan which are connected to a common shaft of the electrical machine, the inner fan and the outer fan having opposing directions of conveyance along an axial direction and the outer fan being disposed in a fan housing which has an inlet opening for an inward flow of a coolant of the outer coolant flow by creating an inner coolant with the inner fan and creating an outer coolant flow separated from the inner coolant circuit with the outer fan, wherein the coolant is guided in a line section which extends in the radial direction of the electrical machine from the inlet opening to the outer fan.

Advantageous developments of the present invention are the subject matter of the dependent claims.

The inventive electrical machine comprises an inner fan in an inner coolant circuit, an outer fan for creating an outer coolant flow separate from the inner coolant circuit, wherein the inner fan and the outer fan are connected to a common shaft of the electrical machine, the inner fan and the outer fan have opposing directions of conveyance along an axial direction of the electrical machine, the outer fan is disposed in a fan housing which comprises an inlet opening for an inward flow of a coolant of the outer coolant flow, wherein the fan housing comprises an air guidance device which guides the coolant in a line section which extends in the radial direction of the electrical machine from the inlet opening to the outer fan.

The electrical machine is especially embodied as a rapidly rotating electrical machine. For example the electrical machine can be embodied as an asynchronous machine with a squirrel-cage rotor. The electrical machine can be embodied according to cooling type IC 611, i.e. the electrical machine can have two separate coolant circuits or coolant flows, which are thermally coupled via a heat exchanger. In particular air can be used as a coolant. As an alternative or in addition the electrical machine can have water cooling. The coolant in the inner coolant circuit is conveyed with an inner fan. The coolant in the outer coolant flow is moved with an outer fan which is disposed in a separate fan housing. The fan housing has an inlet opening, through which the coolant can flow in. From the fan housing the coolant can be guided into a cooler housing of the electrical machine in which the heat exchanger is located.

In the fan housing an air guidance device is provided, with which the coolant or the air leaving the inlet opening is guided to the outer fan in the radial direction of the electrical machine. Through the outer fan the coolant is diverted into the axial direction. For this purpose the inlet opening can be disposed on an outer surface of the fan housing. A number of inlet openings, for example two, can also be provided in the fan housing. The inlet openings, when the electrical machine is set up according to specifications, can be located on a side area or on the underside of the fan housing. The outer fan is offset in the axial direction in relation to the line section which is formed by the air guidance device. Through the embodiment of the air guidance device it can be achieved that less of the noise created by the outer fan reaches the outside.

In one form of embodiment the air guidance device is formed by an inner wall of the fan housing and an air guidance element. A part of the air guidance device can be formed by a wall of the fan housing. This wall can extend in the radial direction of the electrical machine. In addition the wall can have a corresponding recess through which a shaft is guided. The second part of the air guidance device can be formed by an air guidance plate. The air guidance plate can have a first area which extends, starting from the inlet opening of the fan housing, in the radial direction. In addition the air guidance plate can have a second area which adjoins an outer side of the outer fan. The second area can extend essentially in the axial direction of the electrical machine. Between the first and the second area the air guidance plate can have an intermediate area which has a corresponding curvature. The shaping of the air guidance plate enables the diversion of the coolant flow in the fan housing to be encouraged. This enables the axial force created by the outer fan to be adapted so that it acts against the axial force of the inner fan. Thus the load imposed on the bearings can be reduced.

In a further embodiment the fan housing includes a further air guidance device, which is disposed on an outer surface of the fan housing such that a channel running in the axial direction is formed between the outer surface of the fan housing and an inner wall of the further air guidance device. In this case the further air guidance device can preferably be embodied such that the coolant flows through the channel in the axial direction directed in the opposite direction to the direction of conveyance of the outer fan. The further air guidance device can be embodied as an add-on part which is fastened to the outer surface of the fan housing by a screw connection or a welded connection for example. The further air guidance device has an inlet opening through which the coolant or the outside air can flow in. In the further air guidance device the coolant flows, starting from the inlet opening of the further air guidance device, to the inlet opening of the fan housing. As previously described, the coolant then flows from the inlet opening of the fan housing in the radial direction to the outer fan and is diverted there in the axial direction. The geometrical embodiment of the further air guidance device additionally enables noises generated by the outer fan to be prevented from getting out. The further air guidance device enables—especially in relation to the axial extent of the electrical machine—a space-saving apparatus for sound deadening to be provided.

In a further form of embodiment the further air guidance device and the fan housing are embodied in one piece. This enables a housing device to be provided for the outer fan with which the noise generated by the electrical machine can be reduced. In addition the one-piece embodiment of the fan housing and of the further air guidance device enables the installation effort to be reduced.

Preferably a sound-deadening element is disposed on an inner wall of the further air guidance device and/or on an inner wall of the fan housing. Corresponding sound-deadening elements, which can be formed from a plastic, wire wool or the like, can be easily attached—for example by an adhesive connection—to the further air guidance device and/or the fan housing. This enables the noise generated by the electrical machine to be additionally reduced in a simple manner.

In one embodiment a grating element is disposed on the inlet opening of the fan housing and/or on the inlet opening of the further air guidance device. The grating element can be formed by a metal grating or a mesh. This enables the induction of foreign bodies, which can lead to damage to the outer fan, being prevented.

Preferably the outer coolant flow leads from the outer fan through a cooler housing of the electrical machine, wherein an outlet opening of the cooler housing is disposed at a distance from the inlet opening of the air guidance device. The inlet opening of the air guidance device or of the further air guidance device should be disposed as far as possible away from the outlet opening of the cooler housing. Preferably the output opening is disposed in an area of the drive side of the electrical machine and the inlet opening of the air guidance device or of the further air guidance device is disposed on the non-drive side of the electrical machine. This enables it to be prevented that heated air which exits from the outlet opening is sucked back into the corresponding inlet opening. This enables effective cooling of the electrical machine to be made possible.

Finally a method is provided in accordance with the invention for cooling an electrical machine, wherein the electrical machine has an inner fan and an outer fan, which are connected to a common shaft of the electrical machine, the inner fan and the outer fan have opposing directions of conveyance along an axial direction of the electrical machine and the outer fan is disposed in a fan housing which has an inlet opening for an inward flow of the coolant of the outer coolant flow by creating an inner coolant circuit with the inner fan, creating an outer coolant flows separated from the inner coolant circuit with the outer fan and guiding the coolant in a line section which extends in the radial direction of the electrical machine from the inlet opening to the outer fan with air guidance device of the fan housing.

The advantages and developments described above in conjunction with the inventive electrical machine can be transferred analogously to the inventive method.

BRIEF DESCRIPTION OF THE DRAWING

The present invention will now be explained in greater detail with reference to the enclosed drawings, in which:

FIG. 3 shows a housing device for an electrical machine;

FIG. 4 shows a housing device for an electrical machine in a further form of embodiment;

FIG. 5 shows a housing device for an electrical machine in a further form of embodiment;

FIG. 6 shows a housing device for an electrical machine in a further form of embodiment;

FIG. 7 shows a housing device for an electrical machine in a further form of embodiment;

FIG. 8 shows a housing device for an electrical machine in a further form of embodiment.

DETAILED DESCRIPTION OF PREFERRED EMBODIMENTS

The exemplary embodiments described in greater detail below represent preferred forms of embodiment of the present invention.

Figure 1:
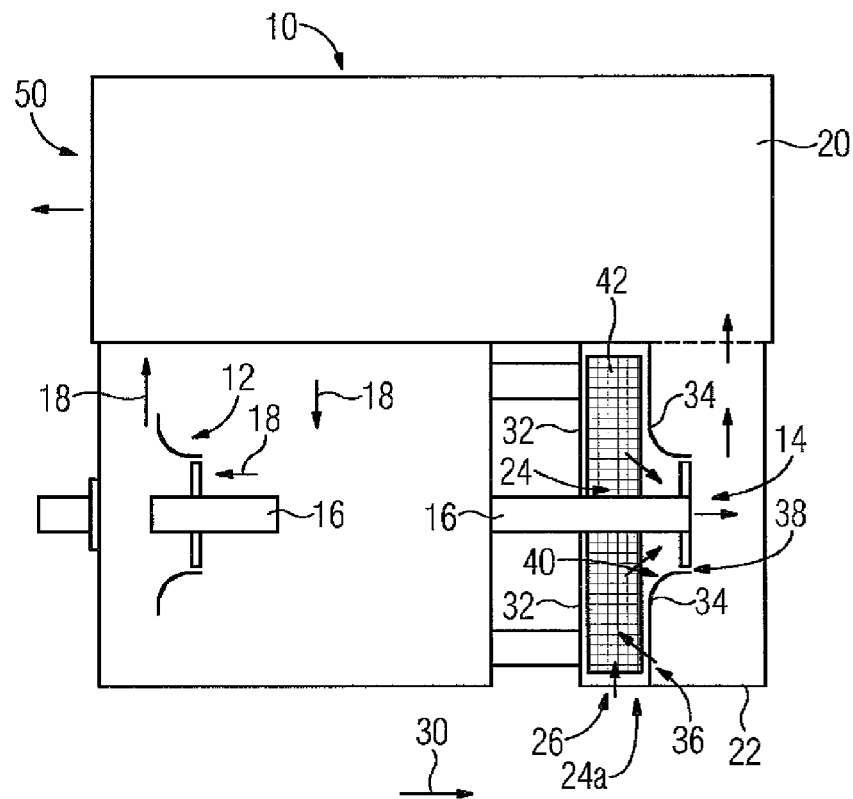
FIG. 1 shows an electrical machine in a schematic sectional view.

FIG. 1 shows a schematic diagram of an electrical machine 10 in a sectional view from the side. The electrical machine 10 can be embodied as an asynchronous machine with a squirrel cage winding. The electrical machine 10 has an inner fan 12 and an outer fan 14. The inner fan 12 and the outer fan 14 are disposed on a common shaft 16. In addition the inner fan 12 and the outer fan 14 have opposing directions of conveyance. The inner fan 12 and the outer fan 14 can be embodied as radial or axial fans. The inner fan inner fan 12 serves to cool the stator and the rotor not shown in the diagram, which have corresponding cooling channels for this purpose. The principal course of the inner coolant circuit formed by the inner fan 12 is indicated by the arrows 18. The inner coolant circuit leads via a heat exchanger which is not shown here which is disposed in a cooler housing 20.

The outer fan 14 is disposed in a fan housing 22 and conveys the coolant or the air of an outer coolant flow, which is separate from the inner coolant circuit. To this end the fan housing 22 has a corresponding inlet opening 24 through which the air flows in laterally from the outside, at right angles to the plane of the drawing of FIG. 1, into the inside of the fan housing 22. From the inlet opening 24 the coolant flows into the cooler housing 20 and via the heat exchanger. In the cooler housing 20 a partition wall not shown here is provided, in order to separate the inner coolant circuit from the outer coolant flow. The coolant exits from an outlet opening 50 of the cooler housing 20.

An air guidance device 26, with which the coolant is guided in a line section which extends in the radial direction of the electrical machine 10, i.e. in a direction to the shaft 16, from the inlet opening 24 to the outer fan 14 is provided in the fan housing 22. The air guidance device 26 is formed by an inner wall 32 of the fan housing 22 and by an air guidance element 34. The inner wall 32 extends in the radial direction of the electrical machine 10, i.e. radially to the shaft 16. The air guidance element 34 has a first area 36 which extends, starting from the inlet opening 24, in the radial direction to the shaft 16. In addition the air guidance element 34 has a second area 38 which extends in the axial direction 30 to an outer side of the outer fan 14. Between the first area 36 and the second area 38 the air guidance element 34 has an intermediate area 40 which has a corresponding curvature. Here the inlet opening 24 is disposed on the side outer wall of the fan housing 22. In addition or as an alternative to this an inlet opening 24a can be provided on the underside of the fan housing 22. A grating element 42 is disposed on the inlet opening 24, through which foreign bodies can be prevented from getting into the outer coolant flow.

The electrical machine shown in FIG. 1 is an embodiment variant in which an air guidance device on the side outer surface of the fan housing has been dispensed with and in which sound deadening does not play any great part.

Figure 2:
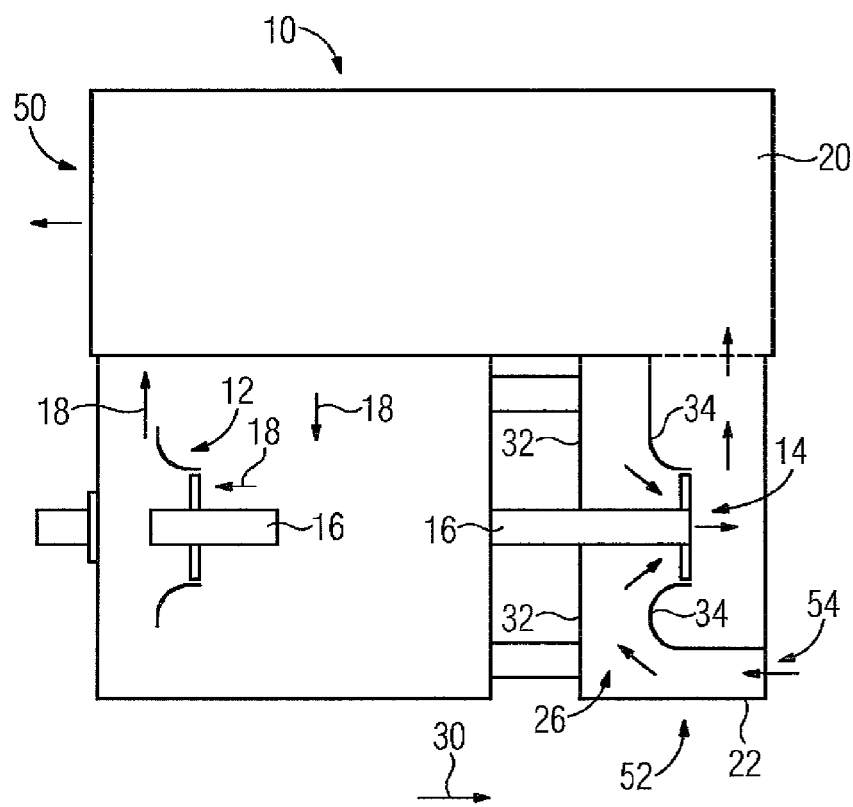
FIG. 2 shows an electrical machine in a further form of embodiment.

FIG. 2 on the other hand shows an embodiment variant of an electrical machine in which an axial air induction in the form of a further air guidance device 52 is integrated into a fan housing 22. Through this an improved sound deadening is produced without additional lateral add-on parts.

FIG. 2 shows an electrical machine 10 in a further form of embodiment in partly sectional schematic view from the side. Here too the coolant is guided by an air guidance device 26 in the radial direction towards a shaft 16 through to the outer fan 14 and subsequently diverted by the outer fan 14 in the axial direction 30. The diversion of the coolant flow is encouraged by an air guidance element. The air guidance element 34 in this case separates the coolant sucked in from the coolant diverted by the outer fan 14. An inlet opening 54 for the coolant flow points here not to one side transversely away from an axis of rotation of the shaft 16 (see FIG. 1), but in the axial direction of the shaft 16 forwards in the non-drive-side direction. The inlet opening 54 is integrated into the fan housing 22. The coolant is sucked in and flows in the axial direction through a further air guidance device 52 integrated into the fan housing 22 initially in the axial direction 30 to the air guidance device 26. The described arrangement of the inlet opening 54 of the further air guidance device 52 relative to the outlet opening 50 of the cooler housing 20 effectively enables it to be prevented that the heated coolant which flows out of the outlet opening 50, is sucked in again through the inlet opening 54.

Electrical machines are described below, on the basis of FIG. 3 to FIG. 9, in which an air guidance device 52 is provided as an add-on part on a side outer surface of the fan housing 22. This add-on part produces an improved deadening of noises of an outer fan.

Figure 9:
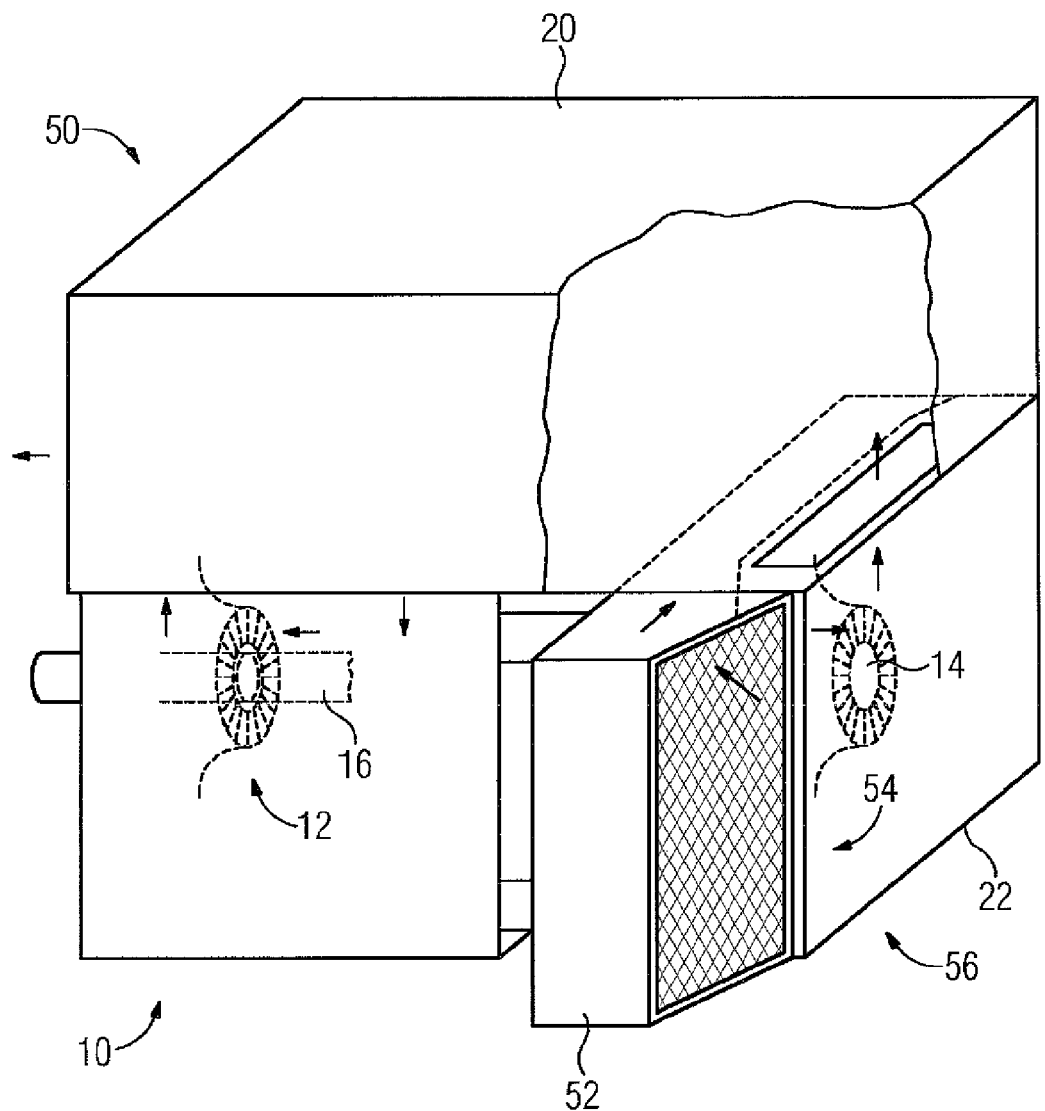
FIG. 9 shows a perspective view of a housing device for an electrical machine in a further form of embodiment.

FIGS. 3 to 8 show schematic diagrams of housing devices 56 for electrical machines 10 in a view from above in each case. FIG. 9 shows a schematic diagram of a partly sectional, perspective view of an electrical machine 10 with a fan housing 22 and an add-on fastened to the side of the machine as an air guidance device 52, which together form a housing device 56.

In FIG. 3 to FIG. 8 the first side 46 and the second side 48 are embodied differently in some cases. This does not absolutely mean that the two sides 46 and 48 of the respective housing device 56 should be embodied differently. This serves instead to clearly delineate the different forms of embodiment of the housing devices 56.

FIG. 3 shows a housing device 56 in a first form of embodiment. FIG. 9 shows the housing device 56 in a perspective view. Here, and also in the subsequent exemplary embodiments, the air guidance element 34, compared to the forms of embodiment shown in FIGS. 1 and 2, has a sloping portion in the first area 36. Disposed on the fan housing 22 is a further air guidance device 52. The further air guidance device 52 can be fastened with a screw connection or welded connection to the fan housing 22. The inlet opening 54, which is protected by a grating element 44, enables the coolant or the air to flow in from outside into the further air guidance device 52. The air flows in the axial direction 30 to the inlet opening 24 of the fan housing 22. From there it is guided by the air guidance device 26 in the radial direction 28 to the outer fan 14. Subsequently the coolant is diverted by the outer fan 14 into the axial direction 30. The embodiment of the air guidance device 26 and the further air guidance device 52 enables it to be prevented that noises or sounds reach the outside from the outer fan 14, since the sound is reflected on the walls of the air guidance device 26 and the further air guidance device 52. In the present exemplary embodiments the further air guidance device 52 on the second side 48 of the housing device 56 has a rectangular cross-section. On the first side 46 of the housing device 56 the further air guidance device 52 is embodied beveled in an area 60 lying opposite the inlet opening 24. The beveling allows it to be achieved that the coolant flow is directed better by the further air guidance device 52 into the air guidance device 26 of the fan housing 22.

FIG. 4 shows a housing device 56 in a further form of embodiment. Here the further air guidance device 52 on the first side 46 and on the second side 48, as described in conjunction with FIG. 3, has a bevel in each case in the area 60. In the exemplary embodiment shown in FIG. 4 the inlet openings 54 of the further air guidance device 52 run at an angle between the radial direction 28 and the axial direction 30. This enables the inflow of the coolant into the further air guidance device 52 to be improved.

FIG. 5 shows a housing device 56 in a further form of embodiment. Here the form of embodiment in accordance with FIG. 4 is developed in that sound-deadening elements 58 are disposed in each case on the inner walls of the fan housing 22 and the further air guidance device 52.

FIG. 6 shows a further form of embodiment of the housing device 56 in which the first side 46 is embodied in accordance with the form of embodiment of FIG. 4. No second air guidance device 52 is disposed on the second side 48. The second air guidance device 52 can be dispensed with for example if no sound deadening is required.

FIG. 7 shows a housing device 56, which is embodied geometrically like the housing device 56 in accordance with FIG. 3. Here the fan housing 22 and the further air guidance device 52 are embodied in one piece. FIG. 8 shows the housing device 56 in accordance with FIG. 7 with additional sound-deadening elements 58.

The invention claimed is:

1. An electrical machine, comprising:
   a shaft defining an axis;
   an inner fan connected to the shaft and disposed in an inner coolant circuit, said inner fan being configured to operate in a first axial direction of conveyance;
   an outer fan connected to the shaft and configured to produce an outer coolant flow which is separate from the inner coolant circuit in a second axial direction of conveyance opposite to the first axial direction of conveyance and to divert the outer coolant flow in an axial direction;
   a fan housing accommodating the outer fan and having an inlet opening for inward flow of a coolant of the outer coolant flow;
   a first air guidance device formed by an inner wall of the fan housing and an air guidance element to guide the coolant in a line section which extends in a direction radially to the axis from the inlet opening to the outer fan;
   a second air guidance device disposed on an outer surface of the fan housing such that an axial channel is defined between the outer surface of the fan housing and an inner wall of the second air guidance device, said second air guidance device having an inlet opening configured to permit flow of coolant into the channel essentially along the axial direction, with the coolant flowing through the axial channel in a direction opposite to the second axial direction of conveyance; and
   a cooler housing through which the outer coolant flow from the outer fan flows, said cooler housing having an outlet opening disposed at a distance from the inlet opening of the first air guidance device in an area of a drive side of the electrical machine, with the inlet opening of the first air guidance device disposed on a non-drive side of the electrical machine.

2. The electrical machine of claim 1, wherein the second air guidance device and the fan housing are made in one piece.

3. The electrical machine of claim 1, further comprising a sound-deadening element disposed on the inner wall of the second air guidance device and/or the inner wall of the fan housing.

4. The electrical machine of claim 1, further comprising a grating element disposed on the inlet opening of the fan housing and/or on the inlet opening of the second air guidance device.

5. A method for cooling an electrical machine having an inner fan, an outer fan, a shaft for support of the inner and outer fans, and a fan housing which houses the outer fan and includes a first air guidance device and an inlet opening for inward flow of a coolant of the outer coolant flow, with the inner and outer fans having opposing directions of conveyance along an axial direction of the electrical machine, said method comprising:
   forming the first air guidance device by an inner wall of the fan housing and an air guidance element;
   creating an inner coolant circuit with the inner fan;
   creating an outer coolant flow separated from the inner coolant circuit with the outer fan;
   guiding the coolant with the first air guidance device of the fan housing in a line section which extends in a radial direction of the electrical machine from the inlet opening to the outer fan;
   arranging a second air guidance device on an outer surface of the fan housing to thereby form an axial channel between the outer surface and an inner wall of the second air guidance device;
   creating an inflow of the coolant essentially along the axial direction into the channel from an inlet opening of the second air guidance device;
   allowing the coolant to flow axially in a direction opposite to a direction of conveyance of the outer fan through the axial channel;
   routing the outer coolant flow from the outer fan through a cooler housing by diverting the coolant from the outer fan in the axial direction, wherein an outlet opening of the cooler housing is disposed at a distance from the inlet opening of the first air guidance, wherein the outlet opening is disposed in an area of a drive side of the electrical machine and the inlet opening is disposed on a non-drive side of the electrical machine.

* * * * *